(12) United States Patent
Kim et al.

(10) Patent No.: US 10,640,118 B2
(45) Date of Patent: May 5, 2020

(54) METHOD FOR CONTROLLING POWERTRAIN OF VEHICLE

(71) Applicants: Hyundai Motor Company, Seoul (KR); Kia Motors Corporation, Seoul (KR)

(72) Inventors: Jeong Sung Kim, Daejeon (KR); Keun Sang Kim, Suwon-si (KR); Hyoseong Wi, Suwon-si (KR); Dae Kwang Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 49 days.

(21) Appl. No.: 16/206,685

(22) Filed: Nov. 30, 2018

(65) Prior Publication Data

US 2019/0329776 A1 Oct. 31, 2019

(30) Foreign Application Priority Data

Apr. 30, 2018 (KR) .................. 10-2018-0049731

(51) Int. Cl.
*B60W 10/06* (2006.01)
*B60W 30/188* (2012.01)
(Continued)

(52) U.S. Cl.
CPC ........ *B60W 30/1886* (2013.01); *B60W 10/02* (2013.01); *B60W 10/026* (2013.01); *B60W 10/06* (2013.01); *B60W 10/10* (2013.01); *B60W 10/30* (2013.01); *B60W 2510/0233* (2013.01); *B60W 2510/0241* (2013.01); *B60W 2510/0657* (2013.01); *B60W 2510/0676* (2013.01); *B60W 2510/30* (2013.01); *B60W 2540/06* (2013.01); *B60W 2710/024* (2013.01); *B60W 2710/025* (2013.01); *B60W 2710/1005* (2013.01); *B60W 2710/30* (2013.01); *Y10T 477/635* (2015.01);
(Continued)

(58) Field of Classification Search
CPC ........... Y10T 477/635; Y10T 477/6395; Y10T 477/6403; B60W 30/1886; B60W 10/026; B60W 10/30; B60W 10/06; B60W 2710/30; B60W 2710/025; B60W 2710/024; B60W 2510/0676; B60W 2510/0657; B60W 2510/0241; B60W 2510/0233; B60W 2510/30; B60W 2540/06
USPC ....................................................... 180/53.8
See application file for complete search history.

(56) References Cited

U.S. PATENT DOCUMENTS 6,016,459 A * 1/2000 Isaac ...................... B60K 28/16
123/436
7,748,483 B2 * 7/2010 Usoro ...................... B60K 6/48
180/65.27
(Continued)

*Primary Examiner* — Roger L Pang
(74) *Attorney, Agent, or Firm* — Morgan, Lewis & Bockius LLP

(57) ABSTRACT

A method for controlling a powertrain of a vehicle may include: controlling, by a controller, an engine of the vehicle to be operated when an ignition key of the vehicle is in an on state; and determining, by the controller, whether the controller generates a command changing a state of a clutch based on an operation state of the vehicle. The clutch connects or disconnects a crankshaft of the engine and a crankshaft pulley including the clutch. The crankshaft pulley is connected to a generator pulley and an air conditioner compressor pulley via a belt.

16 Claims, 7 Drawing Sheets

(51) Int. Cl.
*B60W 10/02* (2006.01)
*B60W 10/10* (2012.01)
*B60W 10/30* (2006.01)

(52) U.S. Cl.
CPC .... *Y10T 477/6395* (2015.01); *Y10T 477/6403* (2015.01)

(56) References Cited

U.S. PATENT DOCUMENTS

| | | | | |
|---|---|---|---|---|
| 2003/0104900 | A1* | 6/2003 | Takahashi | F02N 11/04 477/3 |
| 2012/0225751 | A1* | 9/2012 | Andreae | F02B 67/04 477/5 |
| 2017/0305429 | A1* | 10/2017 | Natori | B60W 10/06 |
| 2018/0266549 | A1* | 9/2018 | Tohta | F16H 61/143 |

* cited by examiner

METHOD FOR CONTROLLING POWERTRAIN OF VEHICLE

CROSS-REFERENCE TO RELATED APPLICATION

The present application claims priority to Korean Patent Application No. 10-2018-0049731 filed on Apr. 30, 2018, the entire contents of which is incorporated herein for all purposes by this reference.

BACKGROUND OF THE INVENTION

Field of the Invention

The present invention relates to a vehicle control method, and more particularly, to a method for controlling a powertrain of a vehicle.

Description of Related Art

A vehicle may include an auxiliary system that operates by receiving rotational power of an engine. The auxiliary system includes a generator (or an alternator), a compressor for an air conditioner, a hydraulic device, and a water pump.

The rotational power of the engine is transmitted from a crankshaft to the auxiliary system by a belt. The auxiliary system includes a pulley for receiving rotational power from the belt.

Driving force from the engine is provided to a plurality of devices included in the vehicle. An auxiliary-machinery device such as an alternator, a power steering, an air conditioner pump, and a water pump disposed in the vehicle is connected to the engine crankshaft through the belt and the belt pulley and is driven by receiving a rotational force of the engine through the belt.

In general, since a rotational force is periodically applied to the crankshaft, torsional vibration and bending vibration are generated. The torsional vibration becomes larger as the rotational force of the crankshaft is greater or as a length of the crankshaft becomes longer. This torsional vibration generates natural vibration and resonance of the crankshaft when a number of rotation of the crankshaft is more than a specific number of rotation. When the torsional vibration is severe, ride quality of the vehicle is reduced, and a timing gear related to the engine and the crankshaft are damaged.

For this reason, in the conventional engine in which the length of the crankshaft is long, a damper pulley having a torsional vibration damping device called a torque vibration damper is mounted on a front end portion of the crankshaft to attenuate the torsional vibration.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method for controlling a powertrain of a vehicle which is configured for reducing or minimizing a loss of driving force of an engine in a belt drive system of the vehicle.

An exemplary embodiment of the present invention may provide the method for controlling the powertrain of the vehicle, including: controlling, by a controller, an engine of the vehicle to be operated when an ignition key of the vehicle is in an on state; and determining, by the controller, whether the controller is configured to generate a command changing a state of a clutch based on an operation state of the vehicle. The clutch may connect or disconnect a crankshaft of the engine and a crankshaft pulley including the clutch. The crankshaft pulley may be connected to a generator pulley and an air conditioner compressor pulley via a belt.

The method for controlling the powertrain of the vehicle may further include: controlling, by the controller, an operation of the engine based on the command. The controlling the operation of the engine may include: when the command is a command changing a state of the clutch to an on state, determining, by the controller, a torque change amount of the engine based on a current torque of the engine, a torque required by a generator having a shaft connected to the generator pulley, and a torque required by an air conditioner compressor having a shaft connected to the air conditioner compressor pulley; increasing, by the controller, an output of the engine based on the torque change amount of the engine; and controlling, by the controller, the clutch so that the state of the clutch is changed from a slip state to the on state.

The controlling the operation of the engine may further include: determining, by the controller, a torque change amount of the engine based on a current torque of the engine, a torque required by the generator, and a torque required by the air conditioner compressor when the command is a command changing a state of the clutch to an off state; reducing, by the controller, an output of the engine based on the torque change amount of the engine; and controlling, by the controller, the clutch so that sequential states of the clutch are the on state, the slip state, and the off state.

The method for controlling the powertrain of the vehicle may further include: controlling, by the controller, a transmission included in the powertrain of the vehicle based on the command.

The controlling the transmission may include: determining, by the controller, whether a torque converter included in the transmission performs a lock-up operation; when the torque converter performs the lock-up operation, determining, by the controller, an slip amount of the torque converter corresponding to a torque change amount of the engine according to the command; and controlling, by the controller, the torque converter to perform a slip operation based on the slip amount of the torque converter.

The method for controlling the powertrain of the vehicle may further include: performing, by the controller, acceleration performance increase control for the vehicle when the command is not generated.

The performing the acceleration performance increase control may include: determining, by the controller, whether a change amount in a value of an acceleration pedal position sensor of the vehicle exceeds a reference value; and when the change amount of the value of the accelerator pedal position sensor exceeds the reference value, controlling, by the controller, the engine so that an output of the engine is increased and controlling a transmission of the vehicle to transmit the output of the engine to a wheel of the vehicle after keeping the clutch in an off state.

The method for controlling the powertrain of the vehicle may further include: driving, by the controller, a motor operating a water pump cooling the engine based on the operation state of the vehicle including a state where a temperature of the engine is equal to or greater than a temperature reference value.

The controller may be configured to control the clutch to change a state of the clutch to an off state based on the command and to control a motor driving a water pump cooling the engine not to be operated when the operation state may include a starting state of the vehicle or a state in which a temperature of the engine is less than a temperature reference value.

The method for controlling the powertrain of the vehicle according to the exemplary embodiment of the present invention may reduce the loss of driving force of the engine due to continuous driving of a mechanical water pump according to driving of the engine and may improve fuel efficiency performance of the vehicle by operating an electric water pump based on size of a thermal load of the engine.

The exemplary embodiment of the present invention may stop auxiliary machinery which is always driven by the drive of the engine and may reduce an inertial load connected to the crankshaft of the engine by releasing the clutch connected between the crankshaft pulley and the crankshaft of the engine based on an operation state of the vehicle. Therefore, energy loss when the vehicle travels (e.g., accelerates) may be minimized or reduced so that fuel economy of the vehicle is improved and acceleration performance of the vehicle is improved.

Furthermore, the exemplary embodiment of the present invention may generate electrical energy according to regenerative braking of the generator by engaging the clutch when the vehicle is in a decelerated state.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
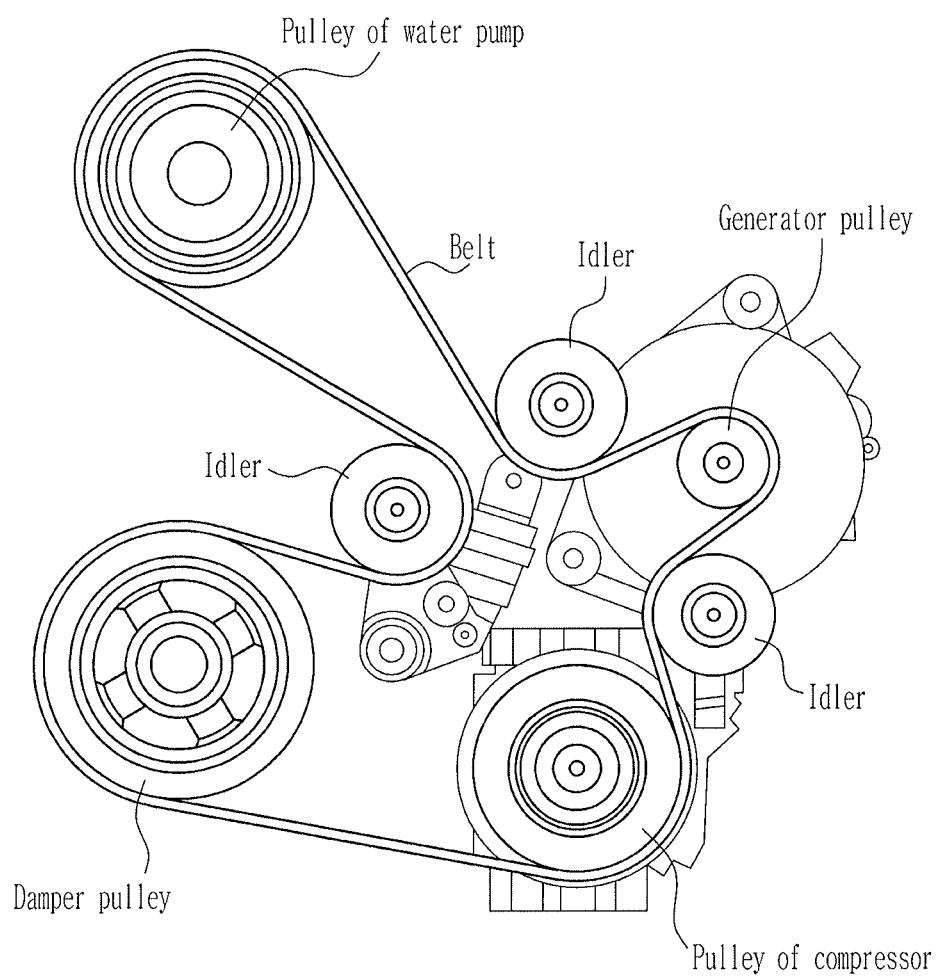
FIG. 1 is a view for explaining an example of a belt system of a vehicle.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

To sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing the present invention, well-known configurations or functions will be omitted in detail since they may unnecessarily obscure the gist of the present invention. Throughout the accompanying drawings, the same reference numerals will be used to denote the same components.

Terms used in the exemplary embodiment are only used to describe specific exemplary embodiments rather than limiting the present invention. Singular forms are to include plural forms unless the context clearly indicates otherwise. It will be further understood that the terms "include" or "have" used in the exemplary embodiment specify the presence of features, numerals, steps, operations, components, or parts mentioned in the exemplary embodiment, or a combination thereof, but do not preclude the presence or addition of one or more other features, numerals, steps, operations, components, parts, or a combination thereof.

Throughout the present specification and the claims that follow, when it is described that an element is "coupled" to another element, the element may be "directly coupled" to the other element or "electrically or mechanically coupled" to the other element through a third element.

Unless defined otherwise, it is to be understood that the terms used in the exemplary embodiment including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

FIG. 1 is a view for explaining an example of a belt system of a vehicle.

Referring to FIG. 1, the belt system may include a device transmitting a power of an engine to auxiliary machinery (e.g., a water pump, a generator (or an alternator), or an air conditioner compressor) using a damper pulley (or a crankshaft pulley). The damper pulley may be bolted to a crankshaft of the engine and may receive the power from the engine to transfer the power to a belt. The transmitted power may drive the water pump mounted on the water pump pulley, the generator mounted on the generator pulley, and the air conditioner compressor mounted on the air conditioner compressor pulley.

The water pump may take charge of a circulation of a coolant for cooling the engine and may rotate in proportion to rotation speed of the engine. Therefore, the water pump may act as a load on the engine even in a driving period of the vehicle in which cooling of the engine is not required, contributing to fuel consumption of the vehicle. The generator may be a device that generates electrical energy necessary for driving the engine and the vehicle, and may rotate in proportion to rotation speed of the engine. Therefore, even when electric power generation is not required, the generator may act as a load on the engine, contributing to fuel consumption. The air conditioner compressor may be a device configured for compressing a refrigerant and may be responsible for cooling of the vehicle internal space. The air conditioner compressor may rotate in proportion to the engine rotation speed and may generate a friction loss due to the rotation of the engine even when the cooling is not required. Thus, the air conditioner compressor may contribute to fuel consumption.

Figure 2:
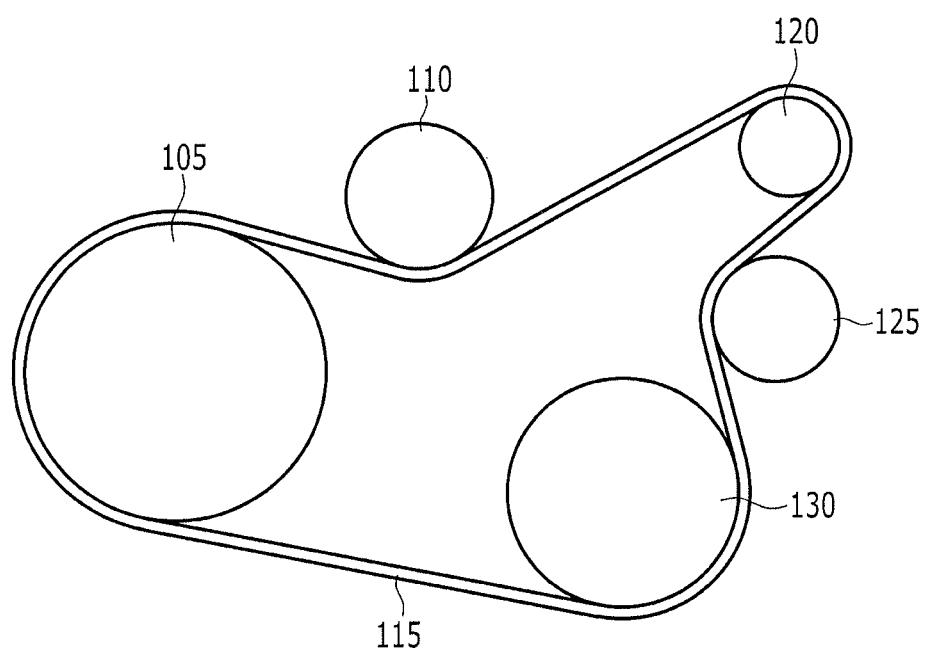
FIG. 2 is a view explaining a belt drive system for a vehicle according to an exemplary embodiment of the present invention.
Figure 3:
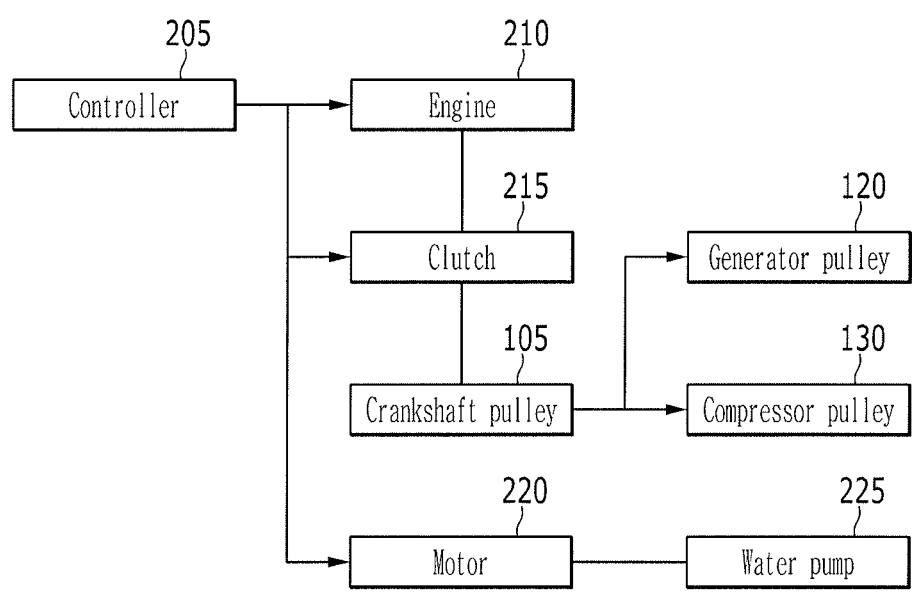
FIG. 3 is a block diagram illustrating a powertrain control device configured for the vehicle according to an exemplary embodiment of the present invention.
Figure 4:
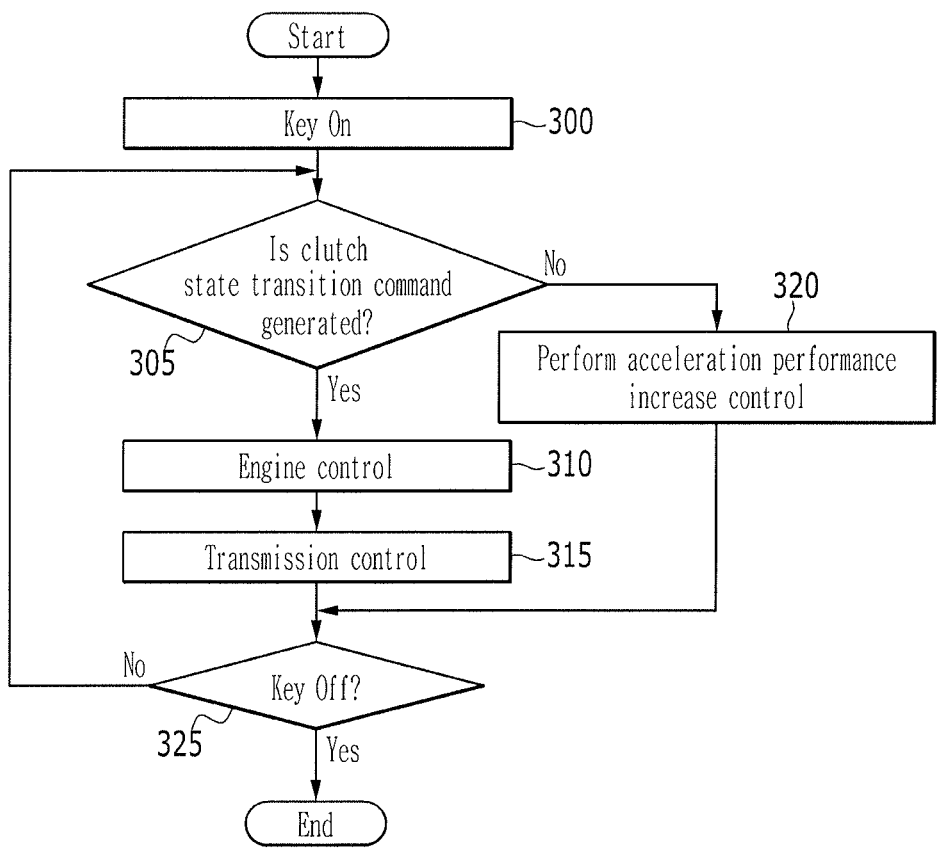
FIG. 4 is a flowchart illustrating a method for controlling a powertrain of the vehicle according to an exemplary embodiment of the present invention.
Figure 5:
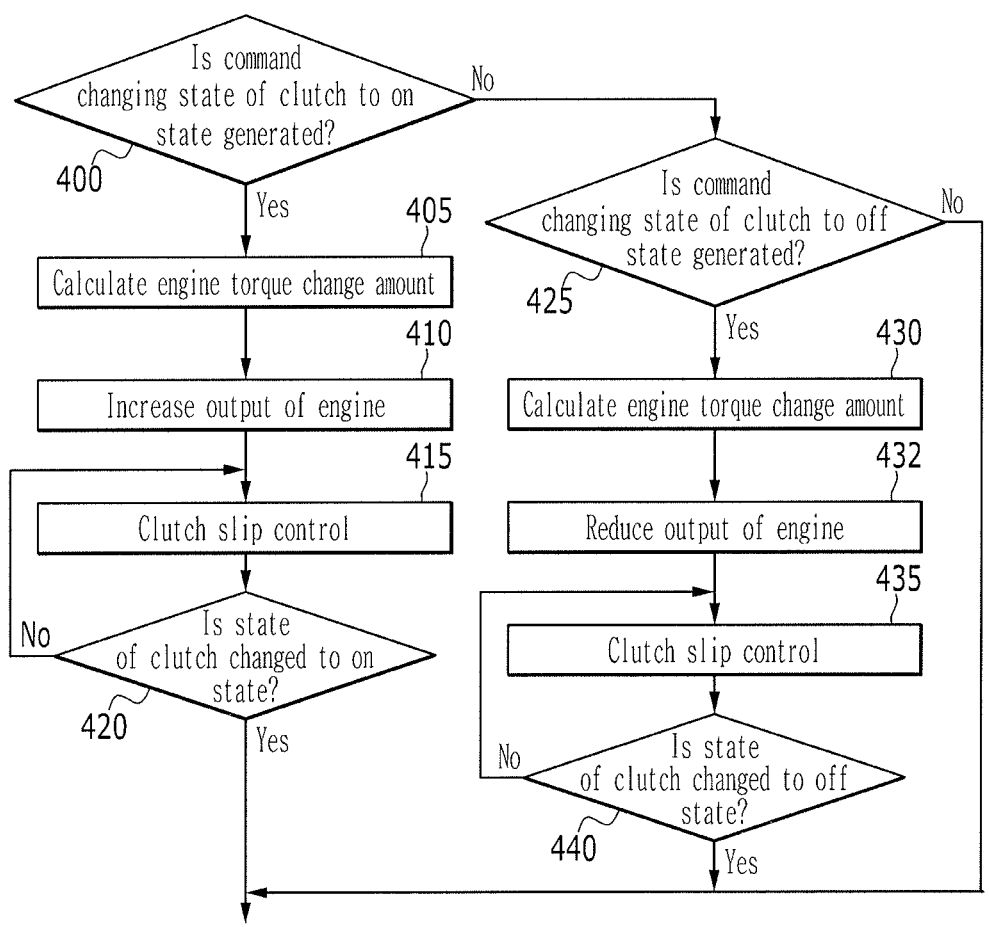
FIG. 5 is a view for explaining an engine control step shown in FIG. 4.
Figure 6:
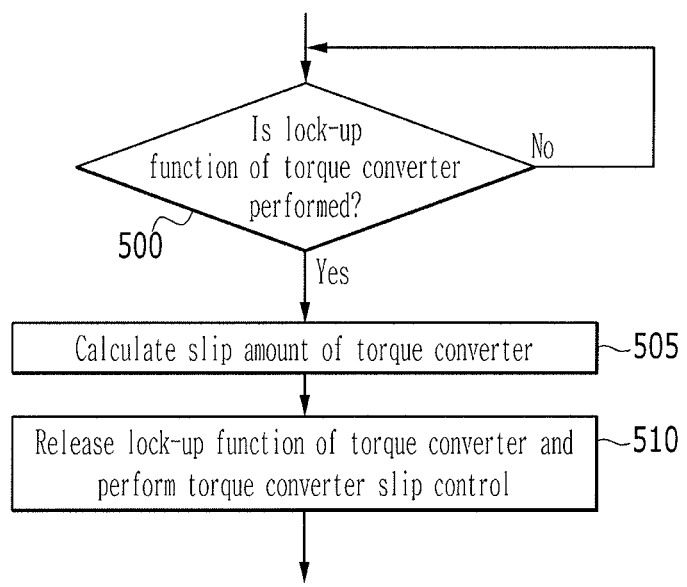
FIG. 6 is a view for explaining a transmission control step shown in FIG. 4.
Figure 7:
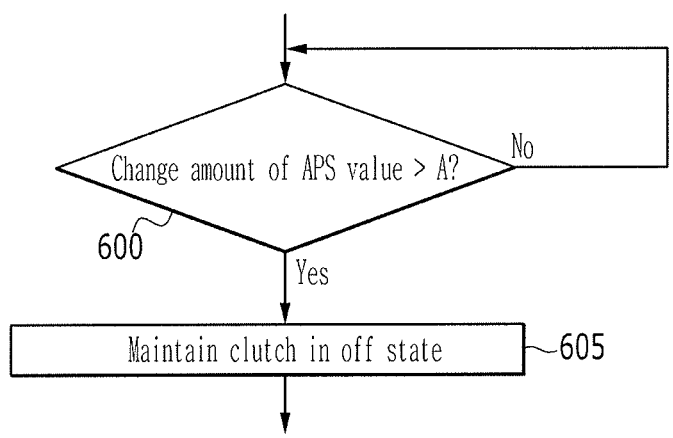
FIG. 7 is a view for explaining an acceleration performance increase control step shown in FIG. 4.

FIG. 2 is a view explaining a belt drive system for a vehicle according to an exemplary embodiment of the present invention. FIG. 3 is a block diagram illustrating a powertrain control device configured for the vehicle according to an exemplary embodiment of the present invention. FIG. 4 is a flowchart illustrating a method for controlling a powertrain of the vehicle according to an exemplary embodiment of the present invention. FIG. 5 is a view for explaining an engine control step shown in FIG. 4. FIG. 6 is a view for explaining a transmission control step shown in FIG. 4. FIG. 7 is a view for explaining an acceleration performance increase control step shown in FIG. 4.

Referring to FIG. 2, FIG. 3, FIG. 4, FIG. 5, FIG. 6, and FIG. 7, in a start step 300, when a start key (or an ignition key) of the vehicle is turned (or when the vehicle's start key is turned on), the controller 205 may control the engine 210 to be operated or started.

As shown in FIG. 3, the vehicle includes a controller 205, an engine 210, a crankshaft pulley (or a damper pulley) 105 including a clutch 215, a generator pulley 120 connected to a shaft of a generator (or an alternator), an air conditioner compressor pulley 130 connected to a shaft of an air conditioner compressor A/C, a motor 220, and a water pump 225. The motor 220 and the water pump 225 may form an electronic water pump.

The crankshaft pulley 105 may be connected to a crankshaft of the engine 210 via the clutch 215.

For example, the controller 205 such as an engine control unit (ECU) may be one or more microprocessors operated by a program or hardware including the microprocessor. The program may include a series of commands for executing the method for controlling the powertrain of the vehicle according to the exemplary embodiment of the present invention. The commands may be stored in a memory. The controller 205 may control an overall operation of the vehicle. The powertrain control method for the vehicle may be applied to the device shown in FIG. 2 and FIG. 3.

As shown in FIG. 2, the crankshaft pulley 105 may be connected to the generator pulley 120 and the air conditioner compressor pulley 130 via a belt 115. In more detail, the crankshaft pulley 105, the generator pulley 120, and the air conditioner compressor pulley 130 may be connected to each other via the belt 115 so that a rotational force of the engine 210 is transmitted via the belt 115 from the crankshaft pulley 105 to the generator pulley 120 and the air conditioner compressor pulley 130. In another exemplary embodiment of the present invention, a first idler 110 and a second idler 125 connected to the belt 115 may be eliminated or omitted.

According to a determination step 305, the controller 205 may determine whether the controller is configured to generate a command allowing a state of the clutch 215 to transition (or change) based on an operation state of the vehicle. The clutch 215 may connect or disconnect the crankshaft of the engine 210 and the crankshaft pulley 105 including the clutch.

The operation state may be detected by a sensor included in the vehicle to be provided to the controller 250. For example, the sensor may include a temperature sensor and a start sensor disposed in the engine, a speed sensor disposed in a wheel of the vehicle, or a voltage sensor disposed in a battery of the vehicle.

When the operation state includes a no-load driving state of the vehicle (e.g., a starting state of the vehicle) or a low temperature state in which a temperature of the engine 210 is less than a temperature reference value, the controller 205 may control the clutch 215 to be changed to an off state (or an open state) and may control the motor 220 driving the water pump 225 to be stopped (or not to be operated). Therefore, all of a driving force of the engine 210 may be used for an operation for preparing for driving the vehicle so that fuel efficiency of the vehicle is improved.

When the operation state includes a high temperature state in which the temperature of the engine 210 is equal to or greater than the temperature reference value, an acceleration state of the vehicle, and a constant speed state of the vehicle, the controller 205 may control the clutch 215 to be changed to an off state (or an open state) and may control the motor 220 driving the water pump 225 to be operated. Therefore, all of the driving force of the engine 210 may be used for driving the vehicle so that fuel efficiency of the vehicle and acceleration performance of the vehicle are improved, and the driven water pump 225 may handle a thermal load of the engine 210.

When the operation state includes a deceleration state of the vehicle corresponding to a regenerative electricity generation state of the vehicle, a low state of charge (SOC) state of the battery of the vehicle, or a state in which the air conditioner compressor of the vehicle is operated, the controller 205 may control the clutch 215 to be changed to an on state (or a close state). As a result, the generator having a shaft connected to the generator pulley 120 may perform electric power generation to charge the battery of the vehicle, and the air conditioner compressor may be operated. The battery may be a battery that supplies electric power to the vehicle's starting device and an electric device of the vehicle.

According to a control step 310, the controller 205 may control an operation of the engine 210 included in the powertrain of the vehicle based on the command. The control step 310 may prevent a shock generated when the state of the clutch 215 is changed.

Referring to FIG. 5, the control step 310 is described below.

According to a determination step 400, the controller 205 may determine whether the command is a command changing or converting the state of the clutch 215 from the off state to the on state.

According to a determination step 405, when the command is a command changing a state of the clutch 215 to the on state, the controller 205 may determine a torque change amount $TQ_{n+1}$ of the engine 210 using the following equation.

$$TQ_{n+1} = TQ_n + TQ_{acc}$$

In the above equation, the $TQ_n$ may be a current torque of the engine 210, and the $TQ_{acc}$ may be a value obtained by summing a torque required by the generator and a torque required by the air conditioner compressor. The torque required by the alternator may be determined based on a current (or a voltage) of the generator or characteristic data of the generator. The torque required by the air conditioner compressor may be determined based on a flow amount of a refrigerant discharged from the air conditioner compressor and the refrigerant pressure of the air conditioner compressor.

According to an adjustment step 410, the controller 205 may increase an output of the engine 210 based on the torque change amount of the engine. For example, the controller 205 may increase the output of the engine 210 by increasing an opening amount (or an opening and closing angle) of a throttle valve that controls an air amount flowing into the engine to increase the air amount. When the engine 210 is a gasoline engine, the controller 205 may advance an ignition timing (or an ignition angle) of the engine 210 to increase the output of the engine. When the engine 210 is a diesel engine, the controller 205 may advance a fuel injection timing of the engine 210 to increase the output of the engine.

According to a control step 415, the controller 205 may control the clutch 215 so that the state of the clutch is switched from a slip state to the on state. The slip control for the clutch 215 may minimize or reduce the shock generated when the state of the clutch is changed. When the slip control of the clutch 215 is performed, the controller 205 may control a delivery torque of the clutch by changing an amount of a current applied to the clutch using a pulse width modulation (PWM) duty control. The off state of the clutch may mean a state in which both end portions of the clutch do not interfere with each other and the clutch is physically separated. The slip state of the clutch may mean a state in which the clutch starts friction and a speed difference between both the end portions is above a predetermined value. The on state of the clutch may mean a state in which there is no speed difference between both the end portions and 100% torque applied to the input of the clutch is transferred to output of the clutch.

According to a step 420, the controller 205 may determine whether the state of the clutch 215 is switched or changed to the on state. When the state of the clutch 215 is not switched to the on state, the powertrain control method of the vehicle, which is a process, may proceed to the step 415. When the state of the clutch 215 is switched to the on state, the process may proceed to a control step 315.

The ignition timing of the engine 210 or the fuel injection timing of the engine may be recovered or moved to an original state after the state of the clutch 215 is switched to the on state.

According to a determination step 425, the controller 205 may determine whether the command is a command to change the state of the clutch 215 from the on state to the off state.

According to a determination step 430, when the command is a command changing a state of the clutch 215 to the off state, the controller 205 may determine a torque change amount $TQ_{n+1}$ of the engine 210 using the following equation.

$$TQ_{n+1}=TQ_n-TQ_{acc}$$

In the above equation, the $TQ_n$ may be a current torque of the engine 210, and the $TQ_{acc}$ may be a value obtained by adding a torque required by the air conditioner compressor to a torque required by the generator. The torque required by the generator may be determined based on a current (or a voltage) of the generator or characteristic data of the generator. The torque required by the air conditioner compressor may be determined based on a flow amount of a refrigerant discharged from the air conditioner compressor and the refrigerant pressure of the air conditioner compressor.

According to an adjustment step 432, the controller 205 may reduce an output of the engine 210 based on the torque change amount of the engine. For example, the controller 205 may reduce the output of the engine 210 by reducing an opening amount (or an opening and closing angle) of a throttle valve that regulates an air amount flowing into the engine 210 to reduce the air amount. When the engine 210 is a gasoline engine, the controller 205 may retard an ignition timing (or an ignition angle) of the engine 210 to reduce the output of the engine. When the engine 210 is a diesel engine, the controller 205 may retard a fuel injection timing of the engine 210 to reduce the output of the engine.

According to a control step 435, the controller 205 may control the clutch 215 so that the clutch is changed from the on state to the slip state and then is changed from the slip state to the off state. The slip control of the clutch 215 may minimize or reduce the shock generated when the state of the clutch 215 is changed. When the slip control of the clutch 215 is performed, the controller 205 may control a delivery torque of the clutch by changing an amount of a current applied to the clutch using a pulse width modulation (PWM) duty control.

According to a step 440, the controller 205 may determine whether the state of the clutch 215 is switched to the off state. When the state of the clutch 215 is not switched to the off state, the powertrain control method of the vehicle, which is the process, may proceed to the step 435. When the state of the clutch 215 is switched to the off state, the process may proceed to the control step 315.

The ignition timing of the engine 210 or the fuel injection timing of the engine 210 may be recovered or moved to an original state after the state of the clutch 215 is switched to the off state.

Referring to FIG. 4, in the control step 315, the controller 205 may control a transmission (e.g., an automatic transmission) included in the powertrain of the vehicle based on the command. The transmission may transmit or block the driving force of the engine 210 to a wheel of the vehicle. The control step 315 may prevent a shock which is generated when the state of the clutch 215 is changed.

Referring to FIG. 6, the control step 315 is described below.

According to a determination step 500, the controller 205 may determine whether a torque converter (or a lock-up clutch of the torque converter) included in the transmission performs a lock-up operation (or a lock-up function). The lock-up clutch may be a device that directly connects the engine and the automatic transmission. The lock-up clutch may couple a power transmitting shaft (e.g., the crankshaft) of the engine 210 and a power transmitting shaft of the transmission.

According to a determination step 505, when the torque converter performs the lock-up operation, the controller 205 may determine a slip amount of the torque converter (or an slip amount of a turbine of the torque converter) corresponding to the torque change amount of the engine according to the command. The turbine may be a rotation member on an output side of the torque converter.

According to a control step 510, the controller 205 may release (or open) the lock-up function of the torque converter and may control the torque converter to perform a slip operation based on the slip amount of the torque converter. The slip operation may minimize or reduce the shock generated when the state of the clutch 215 is changed.

After the slip operation of the torque converter is performed, the powertrain control method of the vehicle, which is the process, may proceed to a step 325.

Referring to FIG. 4, in step 325, the controller 205 may determine whether the ignition key of the vehicle is operated in an off state. When the vehicle's ignition key is not turned off, the method of controlling the powertrain of the vehicle, which is the process, may proceed to the step 305.

According to a control step 320, the controller 205 may perform acceleration performance increase control for the vehicle when the command is not generated.

Referring to FIG. 7, the control step 320 is described below.

According to a determination step 600, the controller 205 may determine whether a change amount in a value of an acceleration pedal position sensor (APS) of the vehicle exceeds a reference value A. In another exemplary embodiment of the present invention, the controller 205 may determine whether the value of the accelerator pedal position sensor of the vehicle exceeds a reference value B.

According to a control step 605, when the change amount of the value of the accelerator pedal position sensor exceeds the reference value A, the controller 205 may keep the clutch 215 in the off state and then may control the engine 210 so that the output of the engine 210 is increased based on a torque demanded by a driver of the vehicle. For example, the controller 205 may increase the output of the engine by increasing an opening amount of (or an opening and closing angle) of a throttle valve that controls an air amount flowing into the engine 210 to increase the air amount. When the engine 210 is a gasoline engine, the controller 205 may advance an ignition timing (or an ignition angle) of the engine 210 to increase the output of the engine. When the engine 210 is a diesel engine, the controller 205 may advance a fuel injection timing of the engine 210 to increase the output of the engine.

After the output of the engine 210 is increased, the controller 205 may control the transmission to transmit the driving force of the engine 210 to the wheel of the vehicle. After the transmission is controlled, the powertrain control method of the vehicle, which is the process, may proceed to the step 325.

The components, "~unit", block, or module which are used in the present exemplary embodiment of the present invention may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling a powertrain of a vehicle, the method comprising:
controlling, by a controller, an engine of the vehicle to be operated when an ignition key of the vehicle is in an on state;
determining, by the controller, when the controller generates a command changing a state of a clutch based on an operation state of the vehicle; and
controlling, by the controller, an operation of the engine based on the command, when the controller generates the command,
wherein the clutch selectively connects a crankshaft of the engine and a crankshaft pulley including the clutch, and
wherein the crankshaft pulley is connected to a generator pulley and an air conditioner compressor pulley via a belt.

2. The method of claim 1, wherein the controlling the operation of the engine includes:
when the command is a command changing the state of the clutch to an on state, determining, by the controller, a torque change amount of the engine based on a current torque of the engine, a torque required by a generator having a shaft fixedly connected to the generator pulley, and a torque required by an air conditioner compressor having a shaft fixedly connected to the air conditioner compressor pulley;
increasing, by the controller, an output of the engine based on the torque change amount of the engine; and
controlling, by the controller, the clutch so that the state of the clutch is changed from a slip state to the on state.

3. The method of claim 2, wherein the torque change amount of the engine is determined by adding the current torque of the engine, the torque required by the generator and the torque required by the air conditioner compressor.

4. The method of claim 2, further including:
controlling, by the controller, a transmission included in the powertrain of the vehicle based on the command.

5. The method of claim 4, wherein the controlling the transmission includes:
determining, by the controller, when a torque converter included in the transmission performs a lock-up operation;
when the torque converter performs the lock-up operation, determining, by the controller, a slip amount of the torque converter corresponding to the torque change amount of the engine according to the command; and
controlling, by the controller, the torque converter to perform a slip operation based on the slip amount of the torque converter.

6. The method of claim 1, wherein the controlling the operation of the engine includes:
when the command is a command changing the state of the clutch to an off state, determining, by the controller, a torque change amount of the engine based on a current torque of the engine, a torque required by a generator having a shaft fixedly connected to the generator pulley, and a torque required by an air conditioner compressor having a shaft fixedly connected to the air conditioner compressor pulley;

reducing, by the controller, an output of the engine based on the torque change amount of the engine; and controlling, by the controller, the clutch so that sequential states of the clutch are an on state, a slip state, and the off state.

7. The method of claim 6, wherein the torque change amount of the engine is determined by subtracting the current torque of the engine from a summation of the torque required by the generator and the torque required by the air conditioner compressor.

8. The method of claim 6, further including:
controlling, by the controller, a transmission included in the powertrain of the vehicle based on the command.

9. The method of claim 8, wherein the controlling the transmission includes:
determining, by the controller, when a torque converter included in the transmission performs a lock-up operation;
when the torque converter performs the lock-up operation, determining, by the controller, a slip amount of the torque converter corresponding to the torque change amount of the engine according to the command; and
controlling, by the controller, the torque converter to perform a slip operation based on the slip amount of the torque converter.

10. The method of claim 1, further including:
controlling, by the controller, a transmission included in the powertrain of the vehicle based on the command.

11. The method of claim 10, wherein the controlling the transmission includes:
determining, by the controller, when a torque converter included in the transmission performs a lock-up operation;
when the torque converter performs the lock-up operation, determining, by the controller, a slip amount of the torque converter corresponding to a torque change amount of the engine according to the command; and
controlling, by the controller, the torque converter to perform a slip operation based on the slip amount of the torque converter.

12. The method of claim 1, further including:
performing, by the controller, acceleration performance increase control for the vehicle when the command is not generated.

13. The method of claim 12, wherein the performing the acceleration performance increase control includes:
determining, by the controller, when a change amount in a value of an acceleration pedal position sensor of the vehicle exceeds a reference value; and
when the change amount of the value of the accelerator pedal position sensor exceeds the reference value, controlling, by the controller, the engine so that an output of the engine is increased and controlling a transmission of the vehicle to transmit the output of the engine to a wheel of the vehicle after keeping the clutch in an off state.

14. The method of claim 1, further including:
driving, by the controller, a motor operating a water pump cooling the engine based on the operation state of the vehicle including a state where a temperature of the engine is equal to or greater than a temperature reference value.

15. The method of claim 1, wherein the operation state includes a starting state of the vehicle or a state in which a temperature of the engine is less than a temperature reference value.

16. The method of claim 15, wherein the controller is configured to control the clutch to change the state of the clutch to an off state based on the command and to control a motor driving a water pump cooling the engine not to be operated.

* * * * *